(12) United States Patent
Kraus et al.

(10) Patent No.: US 8,365,396 B2
(45) Date of Patent: Feb. 5, 2013

(54) CHANGEOVER DEVICE FOR CLAMPING FRAMES

(75) Inventors: Gerhard Kraus, Friedberg (DE); Botho Kikut, Augsburg (DE); Johann Maischberger, Dinkelscherben (DE); Thomas Sturm, Wiedenzhausen (DE)

(73) Assignee: Kuka Systems GmbH, Augsburg (DE)

( * ) Notice: Subject to any disclaimer, the term of this patent is extended or adjusted under 35 U.S.C. 154(b) by 1270 days.

(21) Appl. No.: 11/817,910

(22) PCT Filed: Feb. 22, 2006

(86) PCT No.: PCT/EP2006/001588
§ 371 (c)(1),
(2), (4) Date: Sep. 6, 2007

(87) PCT Pub. No.: WO2006/094631
PCT Pub. Date: Sep. 14, 2006

(65) Prior Publication Data
US 2008/0189939 A1    Aug. 14, 2008

(30) Foreign Application Priority Data
Mar. 9, 2005    (DE) .................... 20 2005 003 913 U

(51) Int. Cl.
    *B23P 19/00*    (2006.01)
(52) U.S. Cl. .............. 29/824; 29/823; 29/822; 29/281.1
(58) Field of Classification Search .............. 29/824, 29/823, 822, 281.1, 430, 559; 228/49.1
    See application file for complete search history.

(56) References Cited

U.S. PATENT DOCUMENTS

| | | | | |
|---|---|---|---|---|
| 4,638,902 A | * | 1/1987 | Kellner et al. | 198/345.1 |
| 4,856,701 A | * | 8/1989 | Pockl | 228/6.1 |
| 5,011,068 A | * | 4/1991 | Stoutenburg et al. | 228/4.1 |
| 5,067,606 A | * | 11/1991 | Schlatter et al. | 198/465.1 |
| 5,400,944 A | * | 3/1995 | Zimmer et al. | 228/49.6 |
| 5,560,535 A | * | 10/1996 | Miller et al. | 228/49.1 |
| 6,343,892 B1 | * | 2/2002 | Kristiansen | 405/195.1 |
| 6,457,574 B1 | * | 10/2002 | Semmlinger et al. | 198/341.05 |
| 2006/0230594 A1 | * | 10/2006 | Stengele et al. | 29/431 |
| 2008/0104815 A1 | * | 5/2008 | Kussmaul | 29/407.01 |

FOREIGN PATENT DOCUMENTS

| | | |
|---|---|---|
| EP | 0 583 282 B1 | 2/1994 |
| EP | 1 172 170 A1 | 1/2002 |
| EP | 1 352 818 A2 | 10/2003 |

* cited by examiner

*Primary Examiner* — Essama Omgba
(74) *Attorney, Agent, or Firm* — McGlew and Tuttle, P.C.

(57) ABSTRACT

A changeover device (8) is provided for tenter frames (5,6,7) in a treatment station (1) for vehicle bodies. The changeover device comprises at least one frame store (9,10) that can be rotated about a rotational axis (11) and is arranged at a distance from a working point (39), and a transport device (17) provided with a guide (18) and a controllable towing device (28) for the tenter frames (5,6,7). The transport device (17) has a guide (18) on the bottom side, for transporting the tenter frames in a vertical position, and also comprises a bottom-side or lateral stabilizing device (64). A towing device (28) for the tenter frames (5,6,7) is arranged in the bottom region of the transport device (17) with at least one driven carriage (29,30).

25 Claims, 10 Drawing Sheets

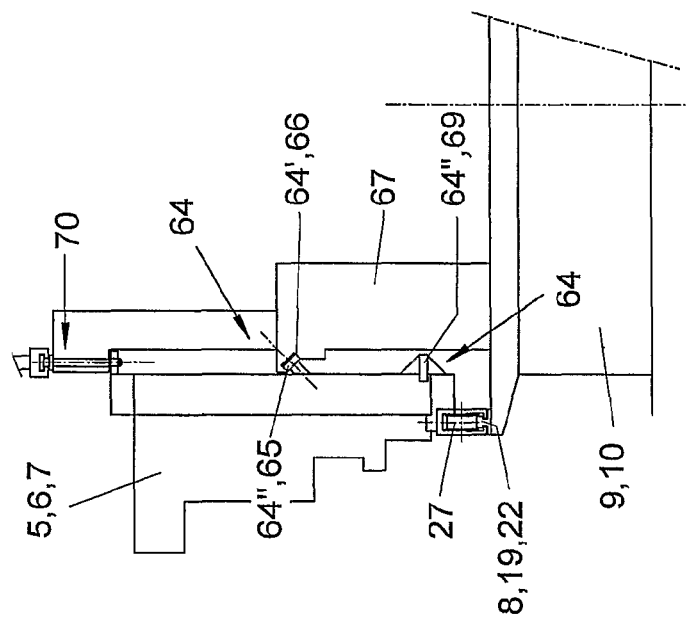
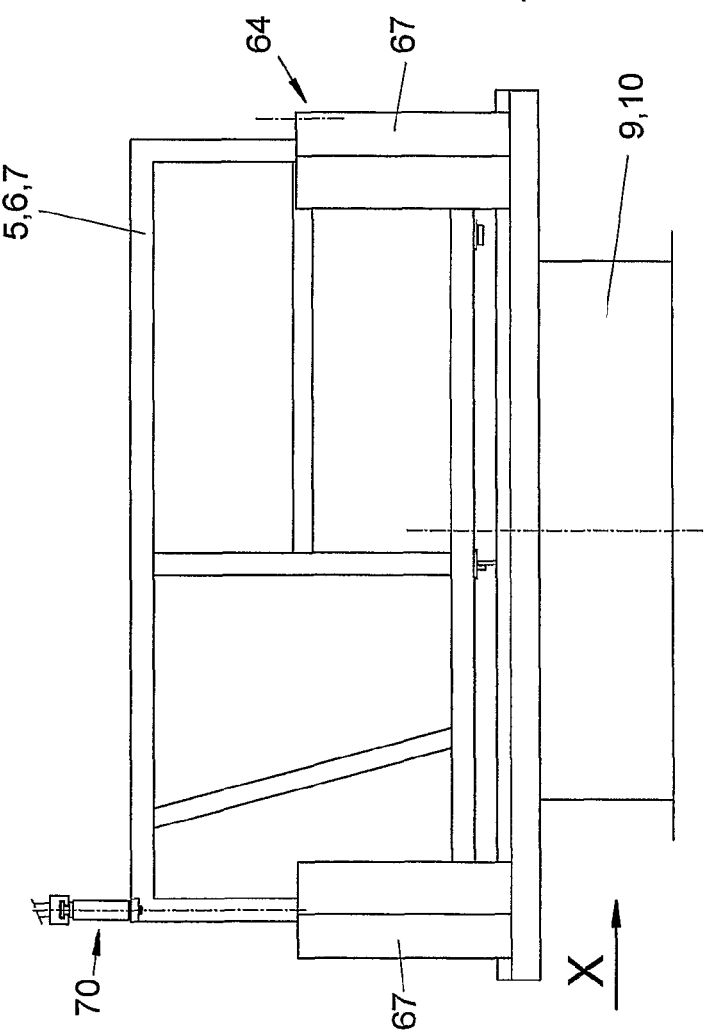

CHANGEOVER DEVICE FOR CLAMPING FRAMES

CROSS REFERENCE TO RELATED APPLICATIONS

This application is a United States National Phase application of International Application PCT/EP2006/001588 and claims the benefit of priority under 35 U.S.C. §119 of DE 20 2005 003 913.6 filed Mar. 9, 2009, the entire contents of which are incorporated herein by reference.

FIELD OF THE INVENTION

The invention relates to a changeover device for clamping frames in a processing station together with the processing station equipped therewith.

BACKGROUND OF THE INVENTION

A changeover device of this type for clamping frames in a processing station for vehicle bodies is known from EP 0 583 282 B1. The changeover device comprises a plurality of drum-shaped frame magazines which can be rotated about a vertical axis of rotation and are arranged at a distance from a working point. A transporting device connects the frame magazines, which are arranged on either side of a transfer line, to one another and to the working point. The transporting device has a straight rail line which has a movable rail section in the region of the working point and of an advancing device there and in the region of the frame magazines. In one embodiment, the rail line is designed as a suspended rail line. In the other variant, the clamping frames roll along rails and are guided at the upper end in a second rail and are secured against tilting. For the transportation of the clamping frames, a towing drive with two running carriages is provided on the upper elevated rail.

SUMMARY OF THE INVENTION

It is the object of the present invention to provide an improved changeover technique for clamping frames.

The invention achieves this object with the features for the changeover device and the processing station according to the invention.

The changeover device claimed and the processing station equipped therewith have the advantage of a lower outlay on construction and need for space. This refers firstly to the lower production costs and the smaller amount of parts. In addition, the control concept can be simplified.

By omitting elevated guides and providing floor-side driving technology, the disturbing contours are also reduced in size and the ability to reach the working point improved, which facilitates and simplifies the planning of the system. The robots at the working point are less obstructed. In addition, the use of gantry robots is facilitated. The possibilities for supplying body components to the working point are also improved.

The shifting of the anti-tilt means into the side or floor region of the clamping frames permits a more flexible design and arrangement of the anti-tilt technology which, depending on the configuration, may also be present only at certain points. Anti-tilt means with preferably oblique guide rollers and roller mounts have the advantage that they provide a certain amount of play, which is advantageous for precise positioning of the clamping frames at the working point. Cramming can be avoided. In addition, depending on the configuration of the transporting device, the anti-tilt means may also be taken over by the towing mechanism during the movement of the clamping frames.

The cycle time performance when changing over the clamping frames is improved. Furthermore, the capacity of the frame magazines is increased by an external feed mechanism which is connected to a further clamping frame store and permits an exchange of frames at the magazine. The clamping frames located in the frame magazine may also be transferred inward and outward for repair or correction work or for other purposes. During this time, the operation of the system may proceed unhindered.

The changeover device can be integrated into new processing stations or else can be retrofitted at existing stations or exchanged for another changeover device present.

In an advantageous manner, the changeover device claimed may also have a better and more flexible concept in terms of drive and transportation. The clamping frames can be moved on their guide with a greater spread of moving options. In particular, the clamping frames can be moved either individually or in a coupled assembly, with there being individual movement options owing to a towing device with a plurality of individually controllable moving carriages mounted on the same guide as the clamping frames. This permits an optimization of the transporting operations and the transporting times. In addition, there is greater flexibility in the design of the system and in the spatial positioning and in the distances of the frame magazines from the working point.

The variant of the towing device with a towing carriage, which is mounted independently and is arranged below or next to the guide for the clamping frames, provides advantages in terms of driving and conception. The driving technology can very largely be removed from the region of movement of the clamping frames and of the robots at the working point. In addition, the driving and control technology is simplified. The clamping frames can be coupled by pivoting arms to the towing carriages and moved in a towing connection with the latter. In this case, the pivoting arms can take over the anti-tilt means of the clamping frame during the journey. By means of appropriate design and coordination of sizes, this towing device can be used to simultaneously move two clamping frames, and therefore, when changing over the frames, the one clamping frame can be removed and the new clamping frame brought in in one movement. An appropriate design of the towing device can obviate the need for collision monitoring of the clamping frames.

In addition, the changeover device permits an improved conception of the processing station. The previous large advancing slide, on which the processing devices, in particular industrial robots, are also placed, can be omitted in favor of a fixed robot arrangement. The changeover technology claimed permits the transporting device to come closer to the transfer line, and a space-saving and small design of the advancing device at the working point. The robots can be placed closer to the body at the working point and, as a result, can be arranged in a fixed manner, their reach being sufficient for the processing operations.

The changeover device may be integrated into new processing stations. As an alternative, it may be retrofitted on existing processing stations or interchanged and reequipped for other changeover devices there. The invention relates to the changeover device per se and also to a processing station equipped with a changeover device of this type.

The invention is illustrated schematically and by way of example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 9 is a front view of a clamping frame guide on a frame magazine according to the arrow IX of FIG. 6;

FIG. 10 is a side view of the clamping frame guide of FIG. 9 according to the arrow X.

DESCRIPTION OF THE PREFERRED EMBODIMENTS

Figure 1:
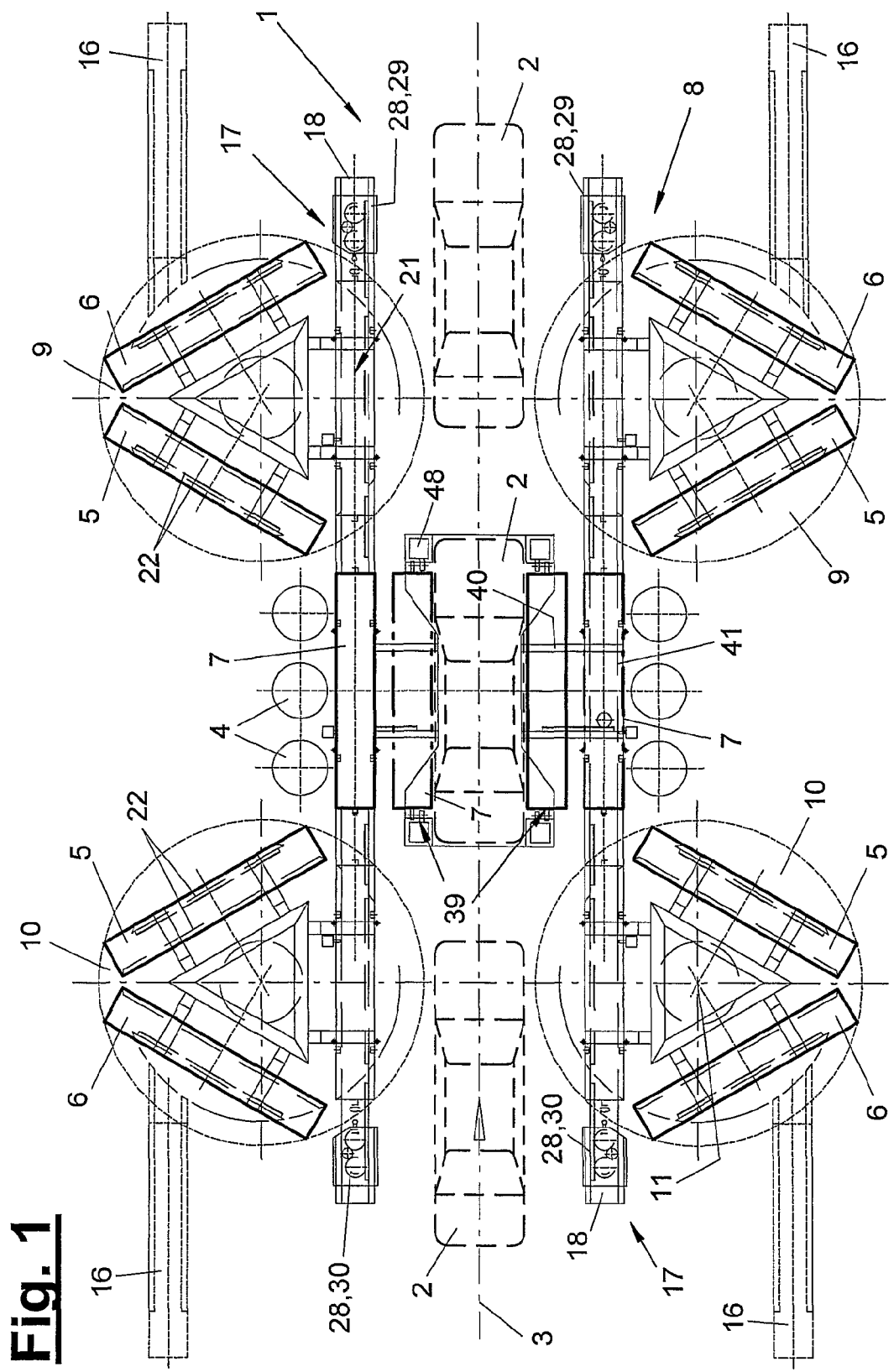
FIG. 1 is a plan view of a processing station with two changeover devices, which are arranged on either side of a transfer line, for clamping frames.
Figure 6:
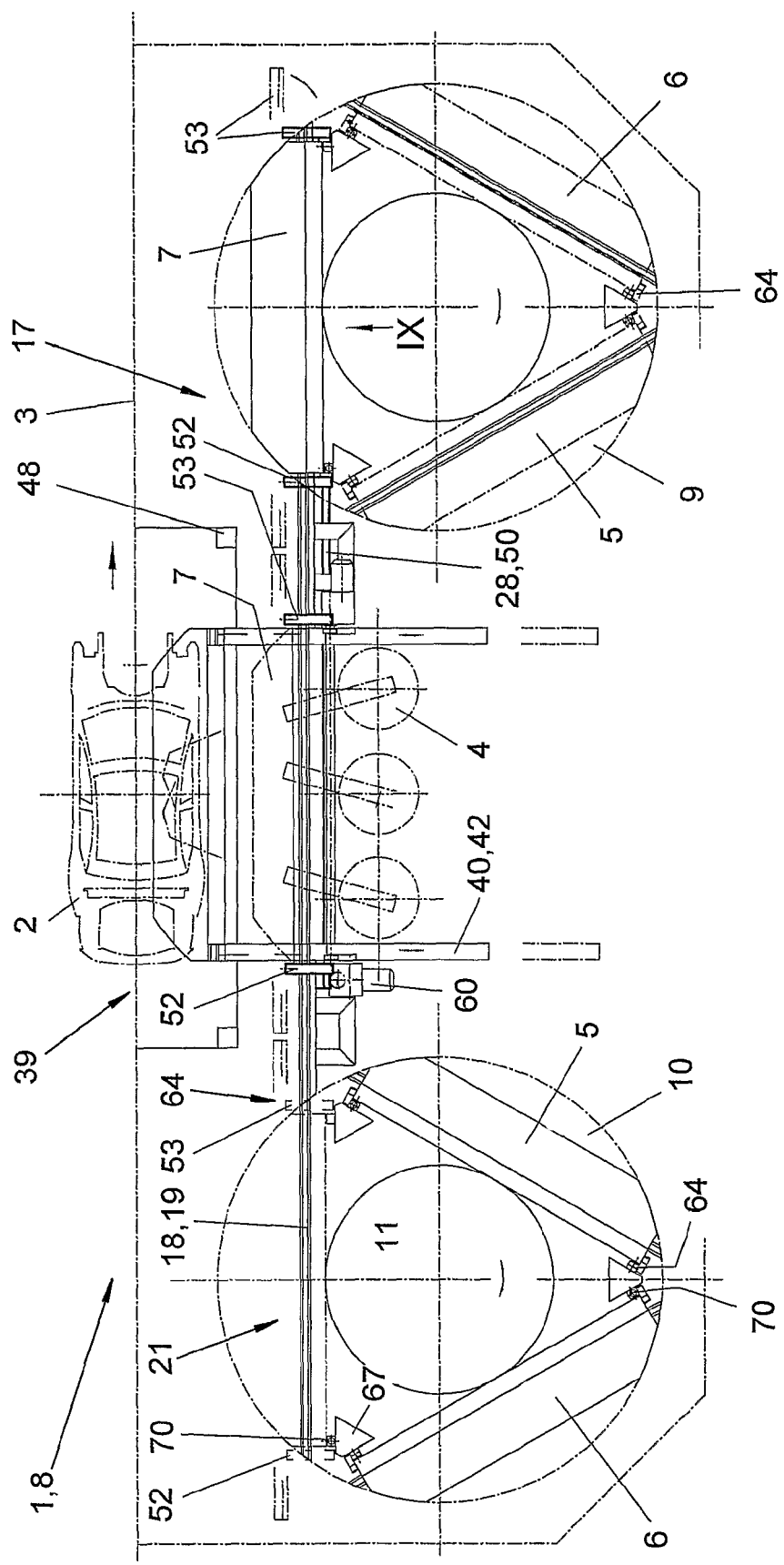
FIG. 6 is a plan view of a variant of the changeover device for clamping frames.

Referring to the drawings in particular, FIGS. 1 and 6 show, in schematic plan views, a processing station (1) for processing workpieces (2) which are fed in and transported away along a transfer line (3) in the direction of the arrow. The workpieces (2) may be of any desired type and size. In the preferred embodiment, they are vehicle bodies, in particular body shells of vehicles. The processing station (1) may be, for example, a framing station or geo station in which the various body parts, such as floor assembly, sidewalls, roof part, etc. are brought into the desired position with respect to one another and joined, in particular tacked by means of welded joints. As an alternative, the processing station (1) may be a different type of welding station, for example a joining welding station. Furthermore, any other desired station designs are possible. The processing operations may be of any desired kind. Apart from welding, processing operations, such as turning, drilling, adhesive bonding, mounting or the like are possible. The processing station (1) is equipped for this purpose with one or more processing devices (4) which can be arranged on one or both sides of the workpieces (2) on the transfer line (3). The processing devices (4) may be of any desired type. In the embodiment shown, they involve six-axle industrial robots which guide welding tools or other tools. The processing devices (4) are preferably arranged in a fixed manner.

For the processing of the workpieces (2), use is made of movable clamping frames (5, 6, 7) which are adapted to different types of workpieces (2), in particular different body shapes. The clamping frames (5, 6, 7) are equipped with suitable clamping tools and, if appropriate, also with integrated processing devices. In the processing station (1), the clamping frames (5, 6, 7) are advanced on a, for example gantry-like, station framework (48) to one or both sides of the workpieces (2) and are fixed in a precise position by means of a clamping frame lock. This position which is correct for processing is referred to as the working point (39) or as the working position.

When changing over the workpieces (2), a changing over of the clamping frames is frequently also required. For this purpose, there is at least one changeover device (8) for the clamping frames (5, 6, 7) in the processing station (1). Two changeover devices (8) are preferably located on either side of the transfer line (3). FIGS. 1 to 5 and 6 to 9 show two variants of the changeover device (8).

The changeover device (8) contains at least one frame magazine (9, 10) and a transporting device (17). The two variants of the changeover device (8) differ, inter alia, in the design of the transporting device (17). In addition, an advancing device (40) for advancing the clamping frames (5, 6, 7) to the working point (39) can be provided. In the two embodiments shown, each changeover device (8) has two frame magazines (9, 10) which are arranged on both sides and at a disturbance-free distance from the working point (39). The frame magazines (9, 10) each receive a plurality of clamping frames (5, 6, 7) at loading points and can be rotated in a circle about an axis of rotation (11). In the embodiment shown, the axis of rotation is an upright or vertical axis of rotation (11).

The arrangement and kinematics of the frame magazines (9, 10) are variable. As an alternative, the changeover device (8) can have just one frame magazine or, in a further modification, a greater number of frame magazines. Furthermore, the frame magazines can rotate about a differently oriented, in particular horizontal, axis of rotation and can be designed as an upright wheel. In addition, the frame magazines may have a plurality of axis of rotational or movement axes, with the clamping frames being moved on a revolving path which differs from a circular form.

In both variants, the transporting device (17) has a guide (18) and a towing mechanism (28) for the clamping frames (5, 6, 7). The guide (18) extends preferably parallel to and at a lateral distance from the transfer line (3). The lateral distance may be smaller than in EP 0 583 282 B1. The frame magazines (9, 10) project into the region of the guide (18). In this overlapping region with the frame magazine (9, 10), the guide (18) has a recess (21). In the exemplary embodiments illustrated, this may be an interruption of the guide (18), with the guide (18) continuing further behind the interruption. As an alternative, the guide (18) may end at the overlapping region and the recess (21).

The frame magazines (9, 10), for their part, have, at each loading point, one or more guide parts (22) which can be introduced or inserted into the recess (21) of the guide (18) and, in the insertion position, can adjoin the fixed guide (18) largely seamlessly. By means of this guiding geometry, the clamping frames (5, 6, 7) can be moved by the fixed guide (18) directly onto the guide parts (22), which are located on the frame magazine (9, 10) and are movable with the frame magazine, or can be retrieved from there.

The guide (18) can also have a corresponding recess (21) in the region of the advancing device (40), the advancing device (40) having one or more guide parts (41) which can be inserted into the recess (21).

The guide (18) and the guide parts (22, 41) can be designed in different ways. In both exemplary embodiments shown, they involve guides which are arranged on the floor side and on which the clamping frames (5, 6, 7) can be transported upright. There is a floor-side and/or a lateral anti-tilt means

(64) for the clamping frames (5, 6, 7). The lateral anti-tilt means (64) engages in the sidewall region and preferably in the lower wall region half of the clamping frames (5, 6, 7). The external supporting part (64') of the lateral anti-tilt means (64), for example a roller mount (66), is arranged in a fixed manner on the processing station (1) laterally next to or below the clamping frame (5, 6, 7) or in a movable manner on the towing device (28). The engagement part (64") of the lateral anti-tilt means (64), which engagement part is assigned to the clamping frame (5, 6, 7), is arranged on the sidewall region, for example on one or more vertical frame carriers.

In the first variant of FIGS. 1 to 5, the lateral anti-tilt means (64) and the lateral guidance of the clamping frames (5, 6, 7) are ensured essentially via the multi-track rail form and the multi-sided guide. In the second variant of FIGS. 6 to 11, there are one or more separate lateral anti-tilt means (64), with it also being possible for the anti-tilt means (64) to be located or supported under the guide (18). There are preferably no guide means in the upper region of the clamping frames (5, 6, 7). In both variants, the towing mechanism (28) is likewise arranged in the floor region and next to or directly on the guide (8).

In the embodiment of FIGS. 1 to 5, the fixed guide (18) and the movable guide parts (22, 41) each comprise two parallel rails (19, 20, 23, 24). As an alternative, the number of rails may be higher or an individual rail with a large supporting width may be used. In the region of their lower side and, if appropriate, in a recessed arrangement on the lower frame wall, the clamping frames (5, 6, 7) have corresponding traveling mechanisms (27) with a plurality of freely rotatable running rollers for form-fitting engagement on three sides and for guidance on the edges of the rail/rails (19, 20, 23, 24). Undesirable tilting or misalignment movements of the clamping frames (5, 6, 7) are prevented by means of the form-fitting connection and the supporting width. The rails (19, 20, 23, 24) are designed, for example, as flat strips or straps which are arranged lying the same height protrude laterally and, at each traveling mechanism (27), are embraced at the top, bottom and laterally by three rollers. As an alternative, other designs of the rails and traveling mechanisms are possible.

Figure 5:
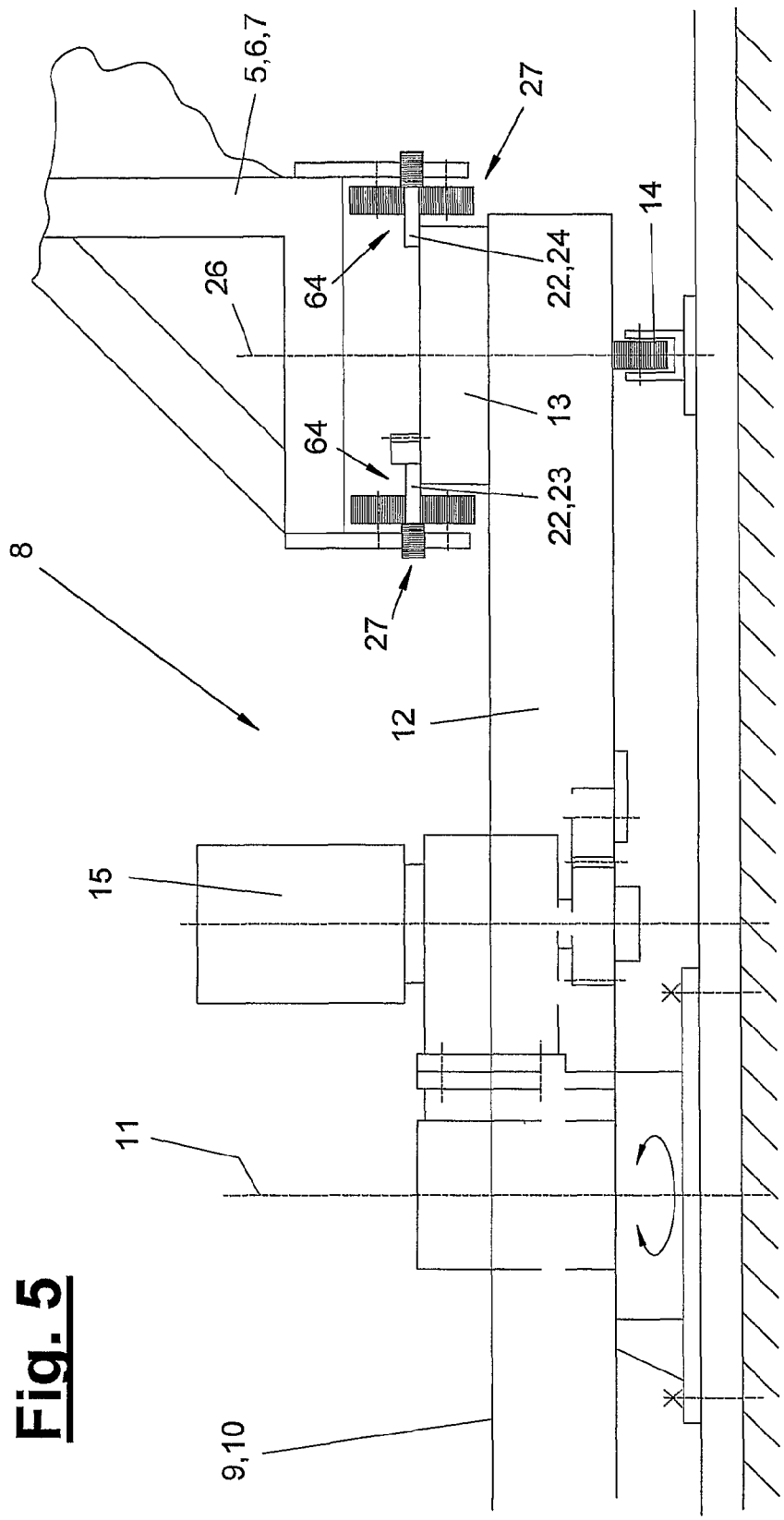
FIG. 5 is a broken-away side view of a frame magazine according to FIGS. 1 to 4.

The frame magazines (9, 10) each have a rotatably mounted machine framework (12) which can be designed, for example in the manner shown in FIG. 5, in the form of a horizontal rotary table which can be mounted rotatably about the axis of rotation (11) and can be rotated in a precise position by means of a drive (15). The drive (15) is connected to a suitable control system (not illustrated). For the precise rotational positioning, there can be positioning aids, for example adjustable stops or the like. A plurality of frame holders (13) are distributed uniformly in a circle about the axis of rotation (11) on the machine framework (12). A respective guide part (22) for receiving one or more clamping frames (5, 6, 7) is arranged on the frame holders (13). The clamping frames (5, 6, 7) can be fixed on the frame holders (13) and their guide parts (22) by means of suitable fixing devices and can be secured during the movements of the magazine. The rotary table is circumferentially supported on the floor side on a plurality of supporting rollers (14) below the frame holders (13).

Figure 2:
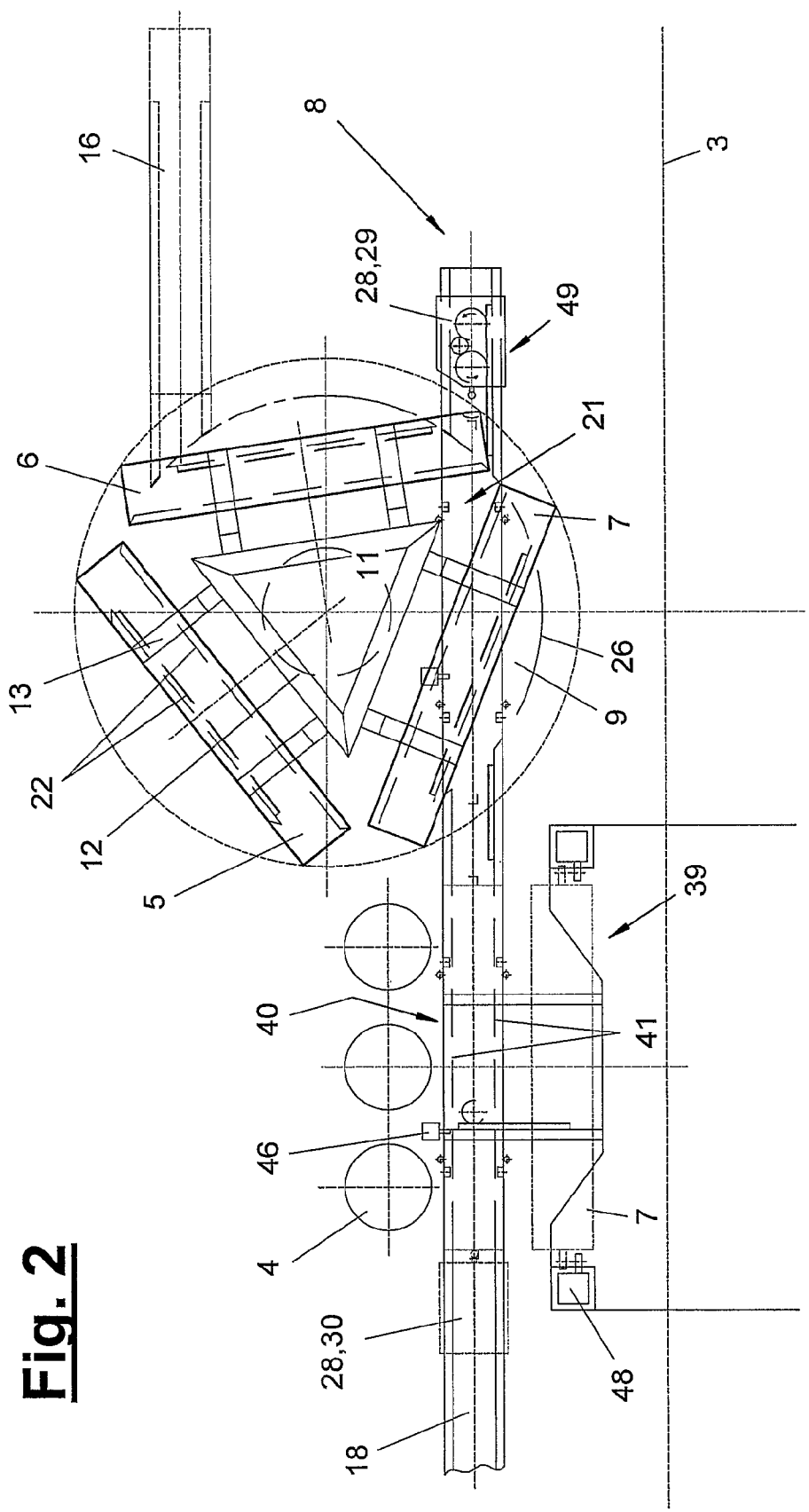
FIG. 2 is a broken-away and enlarged plan view of a frame magazine of FIG. 1, in a rotational position for changing over the frames, and of an advancing device.
Figure 3:
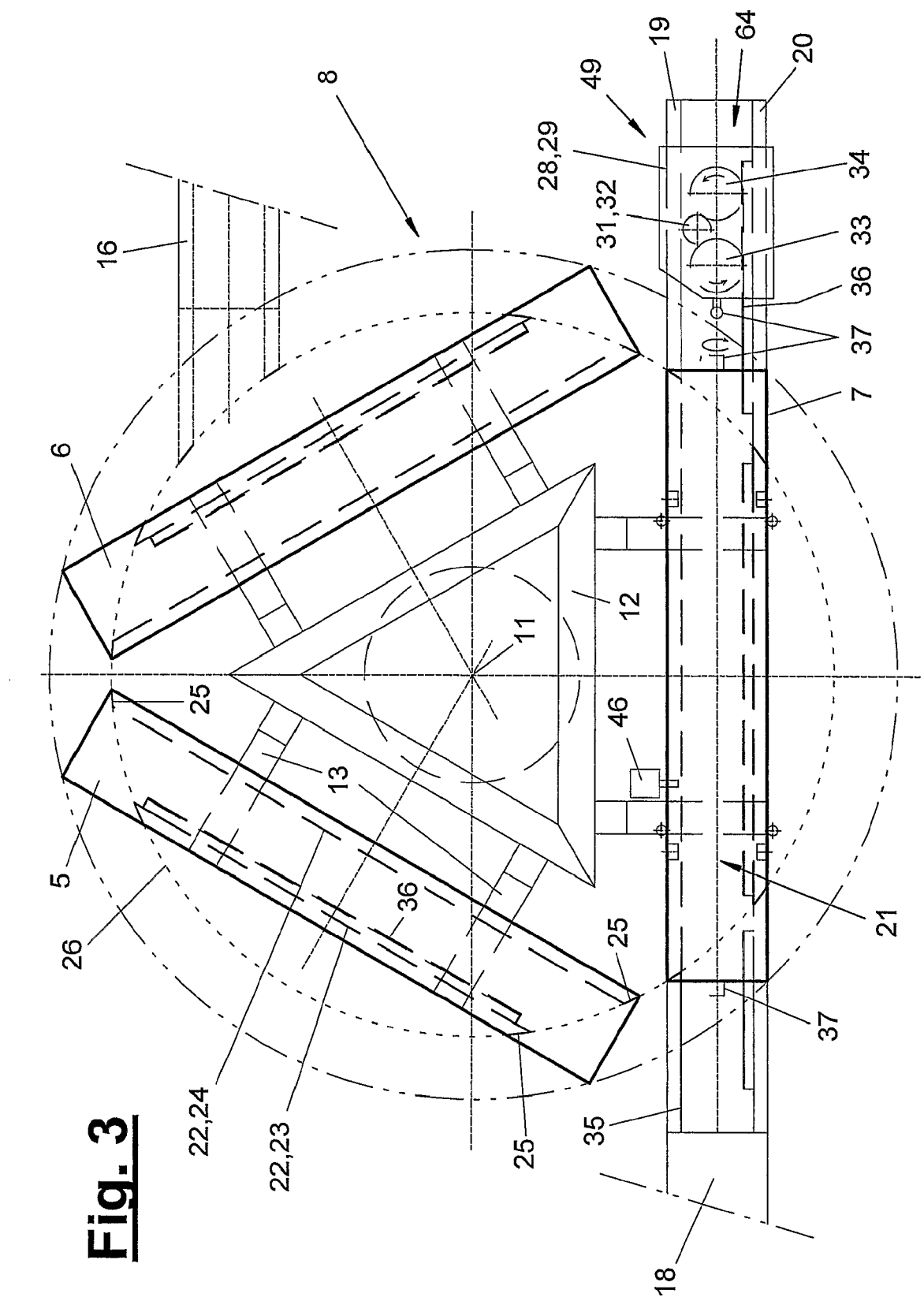
FIG. 3 is an enlarged, broken-away plan view of a frame magazine according to FIG. 1 in a receiving position.

As FIG. 3 clarifies, the inner and outer rails or rail pieces (23, 24) of the guide parts (22) differ in length. They all end at a radius (26) which is concentric with respect to the axis of rotation (11) and at which the fixed rails (19, 20) of the guide (18) also end. In this case, the respective rail ends (25) are designed in accordance with the geometry of the radius and are preferably rounded. The movable and fixed rail ends (25) are preferably set back in each case by a small distance from the radius (26) in order to permit a rotational movement of the frame magazine (9, 10) without cramming. The straight rail shape means that the inner rail pieces (23) are longer than the outer rail pieces (24). The movable rail pieces (23, 24) and the fixed rails (19, 20) are located at the same height, and therefore, in the receiving position shown in FIG. 3, the rails (19, 20, 23, 24) are aligned in the moving direction and permit the clamping frames (5, 6, 7) to roll on and off them. FIG. 2 shows an intermediate position or rotational position of the frame magazine (9) in order to bring a different clamping frame (6) or else an empty guide part (22) into the receiving position. The recess (21) in the guide (18) is visible in the rotational position.

The straight guide parts (22) and rail pieces (23, 24) form secants with respect to the radius (26). This geometry also permits an inward and outward transfer of clamping frames (5, 6, 7) of the frame magazine (9, 10) on one or more external feed mechanisms (16). In the embodiment shown, the latter are connected at a distance from and parallel to the fixed guide (18) in such a manner, and provided in a corresponding manner with guide elements, in particular rails, that, in this case, too, given an appropriate rotational position of the frame magazines (9, 10), clamping frames (5, 6, 7) can be moved up and down.

The clamping frames (5, 6, 7) have a coupling (37) at at least one end, preferably at both ends. This coupling (37) serves to connect two clamping frames (5, 6, 7) and, in addition, for connection to a towing mechanism (28) for moving the clamping frames (5, 6, 7) along the guide (18). The coupling (37) can operate automatically and can be, for example, a hook coupling which opens and closes by itself at the desired points. It can automatically be latched into place on corresponding annular hook receptacles via oblique hook lugs. It can be released by means of run-on humps in order to raise the hooks or the like. As an alternative, the coupling (37) may be controlled remotely and may have one or more suitable drives for opening and closing of a coupling element.

The towing mechanism (28) may be designed in a different manner. In the exemplary embodiment shown, it has one or more moving carriages (29, 30) which are arranged and can move forwards and backwards on the fixed guide (18) and the guide parts (22, 41) which are inserted in an aligned manner in the recesses (21). The moving carriages (29, 30) have, for example, a carriage drive (31) which is carried along on them and is integrated therein, for example an electric motor drive with a suitable power supply, and are connected to a control system (not illustrated) to which the frame magazines can also be connected (9, 10).

FIG. 3 shows an embodiment of the towing mechanism (28) with two moving carriages (29, 30) in detail. In this embodiment, the fixed guides (18) have a recess (21) in the form of a rail interruption and extend beyond the frame magazines (9, 10). By this means, outside the outer circle of disturbance (illustrated by chain-dotted lines) of the frame magazines (9, 10), parking positions (49) are formed in which the moving carriages (29, 30) can remain in the inoperative position and without being affected by the rotation of the magazines. In the embodiment shown with two frame magazines (9, 10), there are parking positions (49) for a respective moving carriage (29, 30) at both ends of the guide. The moving carriages (29, 30) can be controlled separately and can operate independently of each other.

The driving technology may be designed differently. In the exemplary embodiment shown, the moving carriages (29, 30) have propelling means (33, 34) which are distributed and arranged at a distance in the longitudinal direction or direction of travel and are designed, for example, in the form of gearwheels. They interact with at least one fixed propelling element (36) which is designed, for example, in the form of an internal rack on the outer rail (20) of the guide (18). The outer rail pieces (24) of the guide parts (22, 41) also have a rack (36) of this type. The distributed arrangement of the gearwheels ensures that the rail joints at the radius (26) will be reliably traveled over and the driving engagement maintained. The two gearwheels (33, 34) may be driven by a pinion (32) which is connected to the carriage drive (31).

In one variant (not illustrated) with gearwheel diameters and toothed modules of identical size, the pinion (32), for its part, may be a propelling means and may mesh with a rack (35) on the inner rail (19). The pinion (32) is arranged between the two gearwheels (33, 34). This results in a propelling engagement at three separate points in the direction of travel.

In a further variant (not illustrated), the moving carriage (29, 30) may have an external fixed carriage drive, for example a revolving belt drive or chain drive.

In the embodiment shown, the length of the guide parts (22) on the frame magazines (9, 10) is of sufficient dimensions for a respective clamping frame (5, 6, 7) to have room. The guide length may alternatively be larger, and therefore a moving carriage (29, 30) together with a clamping frame (5, 6, 7) also finds room. The moving carriage (29, 30), which is carried along on the frame magazine (9, 10) can then be used for the outward transfer of the clamping frame to the external feed mechanism (16). The power supply is appropriately switched over or carried along. As an alternative, in this variant and also in the other variants described previously, the moving carriage (29, 30) may have an integrated power store with chargeable batteries, pressure stores for fluids or the like. In the parking position (49), the power store is charged up again via a docking station. Otherwise, the external feed mechanism (16) may also have its own and additional moving carriage which, if appropriate, also operates the connected additional magazine for clamping frames (5, 6, 7).

Figure 4:
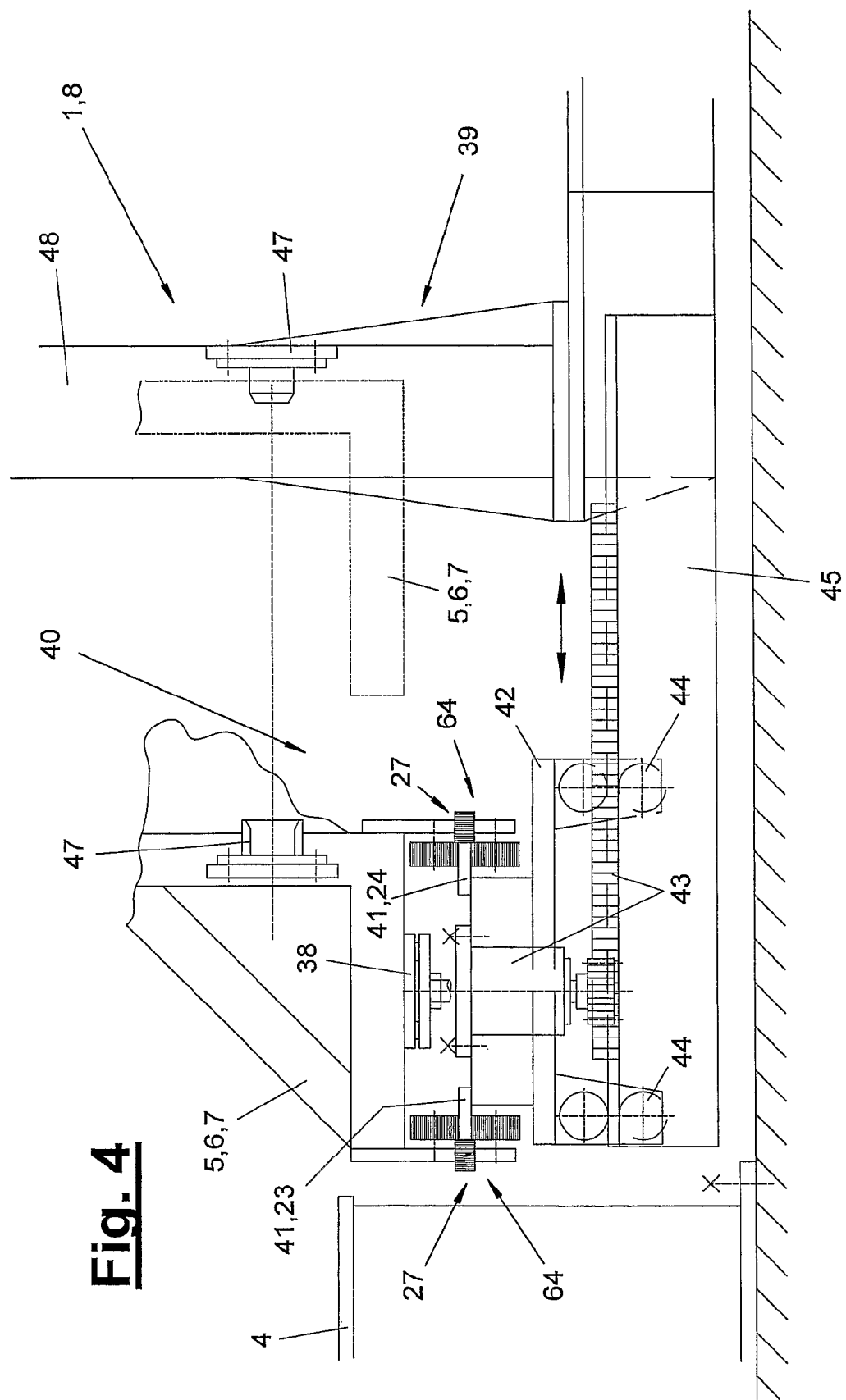
FIG. 4 is a broken-away side view of the advancing device of FIG. 2.

The advancing device (40), which is illustrated in side view in FIG. 4, has an advancing slide (42) which is movable transversely with respect to the guide (18) and with respect to the transfer line (3) and on which the abovementioned guide part (41) with the two rail pieces (23, 24) is arranged. The fixed guide (18) has the interruption (21) in this region. The precise desired position for the clamping frame (5, 6, 7) to be advanced can be found and defined by means of a precise positioning means (46) fitted in a fixed manner on the advancing slide (42) or on the advancing device (40) (see FIG. 2). There may be a similar precise positioning means (46) for clamping frames (5, 6, 7) on the frame magazine or frame magazines (9, 10) in the region of the receiving point in order in this case too to achieve precise positioning of the frame for coupling purposes and for the transportation movements. FIG. 3 shows this arrangement.

The advancing slide (42) furthermore has at least one coupling (38) for the supply of operating means to the clamping frames (5, 6, 7) which, for this purpose, have a corresponding coupling counterpart, for example on the lower side of the frame. The operating means may be electric power and/or signal currents, coolants, compressed air, hydraulic oil or the like. FIG. 4 also clarifies the design of the abovementioned clamping frame lock (47) of which one part is in each case arranged on the clamping frame (5, 6, 7) and the other part on the station framework (48).

The processing devices (4), in particular robots, can be positioned behind the advancing device (40), in relation to the working point (39), and can be arranged in a fixed manner. If appropriate, they have their own movement axis which, when the advancing slide (42) is pushed forward, permits the robot to follow through the recess (21) in the guide (18).

The table-like advancing slide (42) has a chassis (44) with which it is guided movably in the advancing direction on a fixed framework (45) of the advancing device. For this purpose, rails and traveling mechanisms with rollers acting on three sides can be provided in a similar manner as in the case of the guide (18). The rails may have an increased rail clearance at the end in order to avoid cramming in the precise positioning of the clamping frame on the station framework (48). The advancing slide (42) furthermore has a controllable drive (43) which comprises, for example, an electric motor which is mounted on the advancing slide (42) and has a pinion which meshes with a fixed rack on the framework (45). As an alternative, use can be made, for example, of a crank drive.

In the embodiment shown, the frame magazines (9, 10) each have three receiving points and frame holders (13) or guide parts (22) for three different clamping frames (5, 6, 7). In this case, the frame magazines (9, 10), which are arranged on either side of the working point (39), can be fitted with clamping frames (5, 6, 7) in a uniform or different manner. Fitting in a uniform manner is preferred. The operations involved in changing over the clamping frames are described below with reference to FIG. 1. This drawing shows different functional states of the two changeover devices (8) in the upper and lower half of the figure. In the illustration in the lower half of the figure, a clamping frame (7) is located at the working point (39) on the vehicle body (2). It originates from the right frame magazine (9), the associated guide part (22) of which is in the receiving position and is empty. By contrast, the other frame magazine (10) is fully fitted with three clamping frames (5, 6, 7), the frame magazine having been rotated further by one frame position, and therefore the other clamping frame (6) is now in the receiving position and ready to changeover the clamping frame for the subsequent other body (2).

In a mirror-inverted illustration, the upper half of the figure of FIG. 1 clarifies the next functional step by the clamping frame (7) which is to be changed over having been brought back by the advancing device (40) from the working point (39) into an aligned position with the guide (18) and being ready for changing over. The left moving carriage (30) is coupled to the new clamping frame (6) provided and is moved out of the receiving position along the guide (18) to the clamping frame (7) provided and is coupled to it. The clamping frame assembly is then displaced to the right in the next step by the moving carriage (30) until the new clamping frame (6) is in the advancing position and, after being decoupled from the clamping frame (7) and from the moving carriage (30), can be advanced to the working point (39). The clamping frame (7), which is now free, can be coupled by the other moving carriage (29) and brought into the receiving position at the other frame magazine (9). Subsequently, the moving carriage (29) is uncoupled and enters the parking position (49). The other moving carriage (30) is likewise moved back into its parking position (49). Depending on requirements, for the next pending changing over of the frames, the clamping frame (7), which is still standing by, can be brought back again. As an alternative, the frame magazine (9) may rotate further by one position and provides the third clamping frame (5) for a further changing over operation.

In a modification of the above-described functional sequence, the clamping frames (5, 6, 7) may be coupled individually by the respectively associated moving carriage (29, 30) and moved. This would mean, for example for the case in the upper half of the picture of FIG. 1, that first of all the right moving carriage (29) couples to the moved-back clamping frame (7) and pulls it into the receiving position at the right frame magazine (9). In the meantime, the other moving carriage (30) has coupled to the new clamping frame (6) and pushes the latter into the transfer position on the advancing device (40) as soon as the previous clamping frame (7) has left this position. Depending on the functional sequence and next changeover situation, the moving carriages (29, 30) may remain in the given position after being decoupled from their respective clamping frames (5, 6, 7) and then are immediately ready for the next changeover operation. They do not absolutely have to be moved back into their parking position (49).

With the second variant of the changeover device (8) of FIGS. 6 to 10, the basic construction of the processing station (1) with the frame magazines (9, 10) and the advancing device (40) is largely the same as in the first exemplary embodiment of FIGS. 1 to 5. In the second embodiment, the guide (18) and the guide parts (22, 41) on the frame magazines (9, 10) and the advancing device (40) have only an individual rail or running rail (19), with the traveling mechanism (27) being correspondingly adapted to the clamping frames (5, 6, 7). The lateral and tilting guidance required is brought about via at least one anti-tilt means (64) arranged at the side of the rail (19). The anti-tilt means (64) can be arranged above or below the running rail (19). In addition, a different towing mechanism (28) is provided in the second exemplary embodiment.

As FIGS. 6 and 7 clarify in plan view and FIG. 8 in cross section, the towing device (28) is arranged below the guide (18) or the guide parts (22, 41) provided with stands or supports (63). The towing mechanism (28) has a towing guide (57), which is arranged approximately perpendicularly under the guide (18) and extends along the latter, with one or more towing carriages (50) mounted movably on it. In the embodiment shown, there is an individual towing carriage (50). The latter comprises a tow bar (51) with a chassis (59) which has a plurality of pairs of wheels which are in engagement in a form-fitting manner with two horizontal towing rails (58). Four towing arms (52, 53) are mounted pivotably on the tow bar (51) by means of pivot bearings (55) with an oblique axis. The towing arms (52, 53) have an angled shape and can rotate about the oblique bearing axis in such a manner that the front free arm part (54) can move between a towing position transversely with respect to the guide (18) and an inoperative position along the guide (18). By this means, the correspondingly axially positioned towing arms (52, 53) can be folded onto the clamping frames (5, 6, 7) from the outside. The length of the tow bar (51) and the mutual distances between the towing arms (52, 53) are matched to the distances of the frame magazines (9, 10) from the work in point (39) in such a manner that, with the two pairs of towing arms (52, 53), a clamping frame (5, 6, 7) located on the advancing device (40) and a clamping frame (5, 6, 7) located on one of the frame magazines (9, 10) can be moved simultaneously in one transporting movement. As a result, with one stroke, the old clamping frame can be transferred to the free loading point of the other frame magazine and at the same time a new clamping frame from the first frame magazine can be moved into the advancing device (40). In the case of this towing mechanism (28), there is no need for mutual protection of the clamping frames (5, 6, 7) against collision.

The towing carriage (50) has a fixed, controllable towing drive (60) with an electric motor which is in engagement via a driving pinion (62) with a rack (61) on the tow bar (51). The rack (61) has a length which corresponds to the length of the stroke. The tow bar (51) has a greater length which extends, for example, in FIG. 6, from the left towing arm (52) on the advancing device (40) to the right as far as the right, outer towing arm (53) on the right frame magazine (9). The end positions of the towing arms (52, 53) on the other left frame magazine are illustrated by dashed lines. The beam-shaped towing guide (57) extends over the entire length of the processing station (1).

The pivoting actuation of the towing arms (52, 53) takes place via an adjustment element (56) which can be designed in any desired suitable manner. In the embodiment shown in FIG. 8, it comprises an extension arm on the towing arm (52, 53), which is actuated and rotated by an external fixed drive (not illustrated) at the respective take-over or transfer positions of the clamping frames (5, 6, 7), with the pivoting arm (52, 53) executing a corresponding pivoting movement. As an alternative, the towing carriage (50) can have one or more drives carried along on it for one or more towing arms (52, 53).

Figure 7:
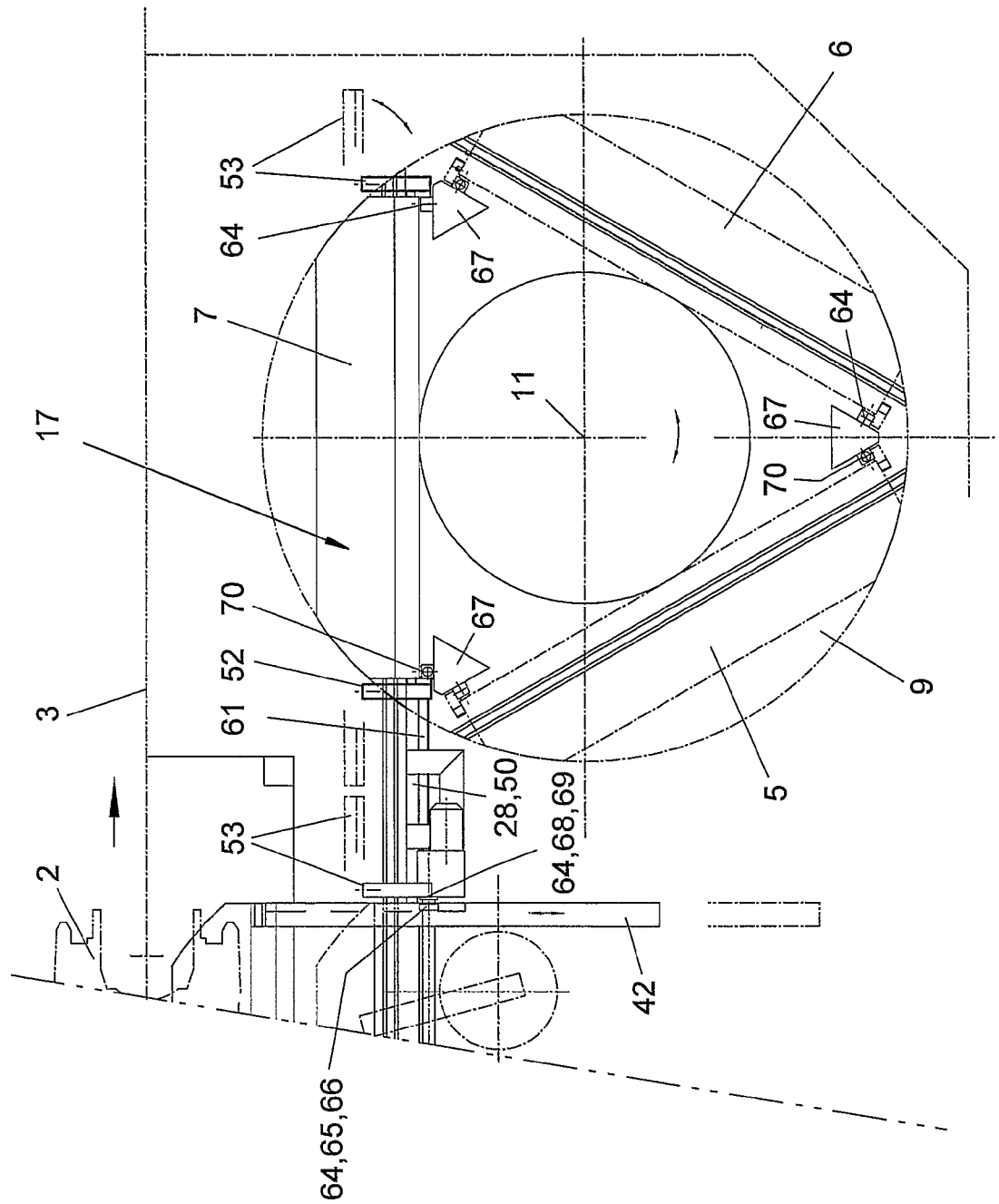
FIG. 7 is an enlargement of a detail of the changeover device of FIG. 6.
Figure 8:
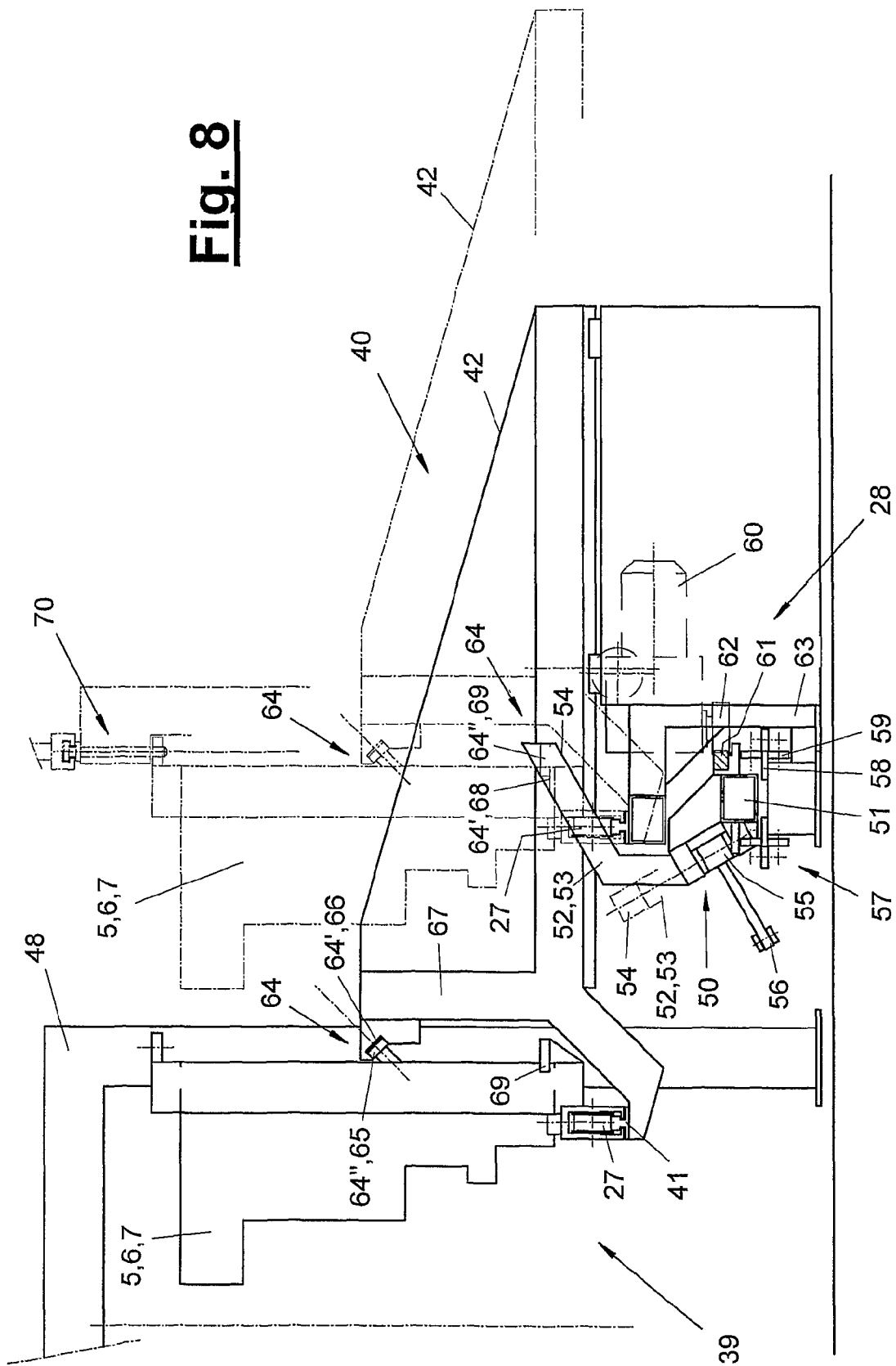
FIG. 8 is an enlarged side view of the changeover device and of the advancing device of FIG. 6 in two positions.

As FIGS. 6 and 7 clarify, the towing arms (52, 53) are folded onto the sidewalls of the clamping frame (5, 6, 7) from the outside and clamp the side walls between them. An anti-tilt means (64) can be provided between the towing arms (52, 53) and the clamping frame (5, 6, 7). The anti-tilt means comprises, for example, according to FIGS. 7 and 8, a tongue and groove guide. In this case, on the side walls of the clamping frames (5, 6, 7) there are laterally protruding guide strips or tongues (69) as the engagement part (64"), which, upon a pivoting-on movement, enter into form-fitting engagement with a supporting part (64'), for example a corresponding groove (68) on the inside of the towing arms (52, 53). The orientation of groove (68) and tongues (69) may be vertical, horizontal or oblique. As an alternative, the anti-tilt means (64) may comprise drivers or rollers on the towing arms (52, 53) as supporting parts (64') which, when the towing arms (52, 53) are folded on, are positioned in a supporting manner in front of the inside of the clamping frames (5, 6, 7) and, if appropriate, also additionally in a guiding manner behind the rear side of the frames. The frame walls form the engagement part (64") in this case. The clamping frames (5, 6, 7) are secured by the anti-tilt means (64) during transportation of the frames.

Additional anti-tilt means (64) which are fixed relative to the guide parts (22, 41) are provided on the frame magazines (9, 10) and on the advancing device (40). The anti-tilt means each comprise a freely rotatable and preferably obliquely oriented guide roller (65) as an engagement part (64") on each clamping frame (5, 6, 7), the guide roller being arranged at a suitable point there, for example on the rear side of one of the vertical edge straps. FIGS. 8 and 10 show this arrangement. In its securing function, the guide roller (65) enters into engagement with a correspondingly shaped roller mount (66) which is located as a supporting part (64') on an upright, stand-like support (67) which is arranged at each loading point of the frame magazines (9, 10) and on the advancing slide (42). When a clamping frame (5, 6, 7) is pushed onto a loading point and a guide part (22) on one of the frame magazines (9, 10) or onto the advancing slide (42) and the guide part (41) thereof, at the latest at the end of the moving stroke, the guide roller (65) enters the roller mount (66) and is held by the latter in a form-fitting manner such that the clamping frame (5, 6, 7) cannot tilt forward or rearward. The roller engagement takes place before the towing mechanism (28) uses it anti-tilt means (64) to release the clamping frame (5, 6, 7). As a result, the clamping frame (5, 6, 7) is secured against tilting in all moving and inoperative positions.

In this case, the anti-tilt means (64) do not have to be too highly accurate because the positioning of the frames is undertaken in a different manner. On the advancing device (40) and at the working point (39), this takes place in the abovementioned manner by means of the precise positioning means (46). There can be a different type of positioning with interlocking means or form-fitting lock (70) at the individual loading points of the frame magazines (9, 10). For this purpose, movable fixing spikes which engage in corresponding tabs on the rear side of the clamping frame are fitted, for example, to the three or more supports or stands (67). FIGS. 7 and 8 show this arrangement. The interlocking means (70) and the anti-tilt means (64) are arranged on different outer sides of the frames. The interlocking means (70) are fixed on the magazine and secure the clamping frames (5, 6, 7) during rotations of the magazine and prevent the clamping frame (5, 6, 7) from rolling away. In the first embodiment of FIGS. 1 to 5, the frame magazines (9, 10) may have similar locks (70) (not illustrated).

Figure 11:
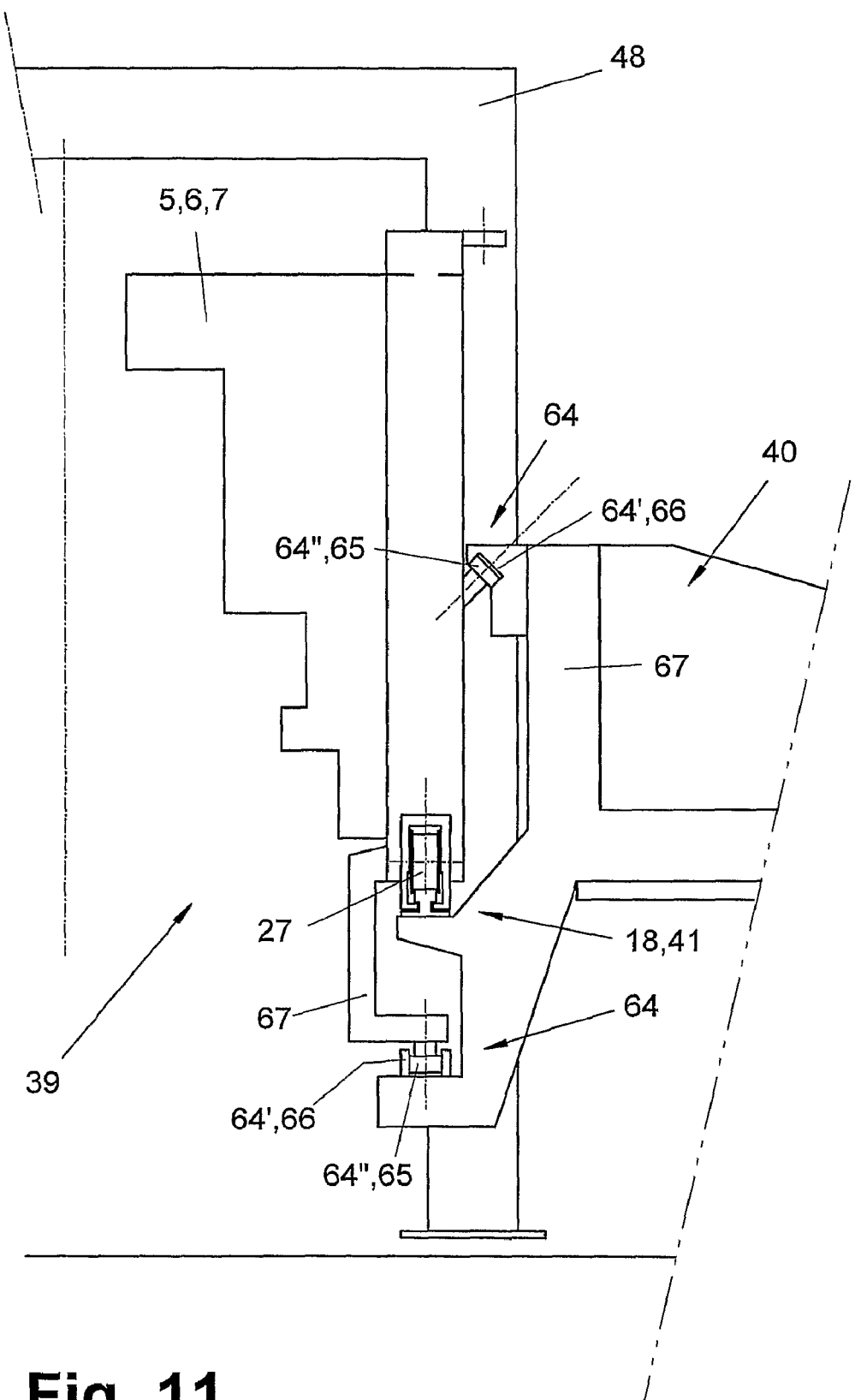
FIG. 11 is a variant of the arrangement of the anti-tilt means and of the frame traveling mechanism.

FIG. 11 shows a variant of the lateral anti-tilt means (64) and the arrangement of the frame traveling mechanism (27). In this case, the supporting part (64') of the anti-tilt means (64), for example a roller mount (66), is arranged below the guide (18) or the guide section (41) on the advancing device (40) (illustrated by way of example). In this case too, the engagement part (64") of the anti-tilt means (64) has a guide roller (65) which is freely rotatable about a vertical axis and is arranged here on a support (67) which is designed as an extension arm and protrudes downwards from the clamping frame (5, 6, 7) around the guide (18, 41). The roller mount (66) is located on a movable support connected to the advancing device (40) or on a fixed support. There may also be a corresponding arrangement in the region of the magazine.

The upper anti-tilt means (64) (illustrated in FIG. 8 and also in FIG. 11) on the stand (67) may be provided in addition to the lower anti-tilt means. It may alternatively also be omitted. FIG. 11 also shows an arrangement of the traveling mechanism (27) that is recessed in the lower region of the clamping frame. This reduces the overall height and the space required.

Modifications of the embodiments shown and described are possible in various ways. Firstly, the guides (18) and the guide parts (22, 41) and the anti-tilt means (64) can vary in their shape, orientation and arrangement. They can have, for example, a lateral rail on which the clamping frames (5, 6, 7) are additionally guided by means of corresponding running rollers. In all of the variants, the clamping frames (5, 6, 7) are preferably connected to the guides (18) or the guide parts (22, 41) in a directly and independently movable manner. In addition, the guides (18) may have a curved profile in order to connect frame magazines (9, 10) arranged further away. This free design of the guides enables the frame magazines (9, 10) to be arranged at any desired point. By means of the individually controllable moving carriages (29, 30), the moving and advancing movement of the clamping frames (5, 6, 7) can be decoupled from one another, and therefore, in this respect, there is no obstacle to individual and different positionings of the frame magazines (9, 10).

In addition, the configuration and arrangement of the towing device (28) is variable. Instead of the moving carriages (29, 30), the towing device may have simpler drives, for example extendable cylinders, chain drives, cable drives or the like. The two embodiments of towing drives (28) with the two moving carriages (29, 30) and the towing carriage (50) that are illustrated in the previously described exemplary embodiments have independent inventive significance and may be independent of the type of guide (18). They can also be used with other types of guide, in particular the conventional lower and upper guide rails known from the prior art. In this connection, the towing mechanism (28) may also be arranged at a different point than in the region of the floor. The anti-tilt means (64) claimed also have inherent inventive significance, in particular in the variant with the guide rollers (65) and the roller mount (66). The guide concept with a floor-side rail guide and lateral or floor-side anti-tilt means (64) can also be successively used in conjunction with other types of frame magazines and changeover devices and other towing mechanisms. In addition, the above-described extensions of the magazine and the external feeding mechanisms (16) obtain inherent inventive significance. They may also be used on any other and conventional frame magazines and changeover devices.

In addition, the technical design of the frame magazines (9, 10) and the orientation and fitting thereof is variable. The number and arrangement of the magazines (9, 10) in the processing station (1) may also vary.

While specific embodiments of the invention have been shown and described in detail to illustrate the application of the principles of the invention, it will be understood that the invention may be embodied otherwise without departing from such principles.

The invention claimed is:

1. A processing station changeover device for clamping frames for vehicle bodies, the processing station changeover device comprising:
   a frame magazine which can be rotated about an axis of rotation and is spaced apart from a working point, the frame magazine including a plurality of frame holders, each frame holder being at a loading point of the frame magazine for receiving holding and releasing one of the clamping frames, the frame magazine being rotated to selectively position said frame holders in a clamping frame releasing position; and
   a transporting device with a floor-side clamping frame guide for receiving the clamping frames from one of the frame holders rotated into the clamping frame releasing position and for an upright transportation of the clamping frames along the floor-side clamping frame guide from the frame holders to adjacent a vehicle body working position along a vehicle body transfer line, with a floor-side or lateral anti-tilt means and with a controllable towing mechanism arranged in the floor region, for the clamping frames.

2. A changeover device as claimed in claim 1, wherein the towing mechanism comprises a plurality of moving carriages driven in an individually movable manner along said floor side guide.

3. A changeover device as claimed in claim 2, wherein the clamping frames and the moving carriages have couplings, said couplings being remotely controllable.

4. A changeover device as claimed in claim 2, wherein each moving carriage has a controllable carriage drive carried along with the respective moving carriage and a plurality of distributed propelling means which are in engagement with at least one propelling element on the guide.

5. A changeover device as claimed in claim 1, wherein the towing mechanism has a towing guide arranged next to or below the floor-side clamping frame guide, with at least one towing carriage driven in a controlled manner and with a coupling for engagement with a clamping frame.

6. A changeover device as claimed in claim 5, wherein the towing carriage has a tow bar which extends along the guide and has a chassis and coupling.

7. A changeover device as claimed in claim 5, wherein the towing mechanism has a stationary towing drive which acts on the towing carriage.

8. A changeover device as claimed in claim 5, wherein the towing drive has a pinion which meshes with a rack arranged on the towing carriage.

9. A changeover device as claimed in claim 1, wherein the floor-side clamping frame guide has a plurality of floor-side parallel rails forming the anti-tilt means for anti-tilt guidance of the clamping frames.

10. A changeover device as claimed in claim 1, wherein the clamping frames have traveling mechanisms with a plurality of rollers for form-fitting, anti-tilt engagement on the rails.

11. A changeover device as claimed in claim 1, wherein the floor-side clamping frame guide has a rail, with a plurality of stationary anti-tilt means provided laterally or below the floor-side clamping frame guide.

12. A changeover device as claimed in claim 11, wherein
the engagement part is arranged on a side wall region on one or more vertical frame carriers;
the anti-tilt means has at least one guide roller and at least one roller mount;
the guide roller is arranged on the clamping frames and a plurality of roller mounts are arranged on the frame magazines;
an anti-tilt means is arranged on the towing arms; and
the anti-tilt means acts in the side wall region in the lower wall region half of the clamping frames and has an external supporting part arranged in a fixed or movable manner laterally next to or under the clamping frame and at least one engagement part assigned to the clamping frame.

13. A changeover device as claimed in claim 1, wherein the transporting device has an advancing device for advancing the clamping frames to the working point.

14. A changeover device as claimed in claim 13, wherein:
the floor-side clamping frame guide has a recess in the region of the advancing device, and the advancing device has one or more guide parts which can be inserted into the recess;
the advancing device has an advancing slide, which is movable transversely with respect to the floor-side clamping frame guide, with the guide part and a precise positioning means for at least one clamping frame;
the advancing slide has at least one coupling for the supply of operating means to the clamping frames; and
the advancing slide of the clamping frame has a clamping frame lock which can be connected to a station framework.

15. A changeover device as claimed in claim 1, wherein:
each of said plurality of frame holders has a respective guide part for receiving at least one clamping frame arranged on the frame holder.

16. A changeover device as claimed in claim 1, further comprising a feed mechanism with guide elements for the inward and outward transfer of clamping frames, said feed mechanism being connected to the frame magazine.

17. A changeover device as claimed in claim 1, wherein:
the transporting device has an advancing device for advancing the clamping frames to the working point; and
the advancing device has an advancing slide, which is movable transversely with respect to the floor-side clamping frame guide, the advancing device having a guide part and a precise positioning means for at least one clamping frame.

18. A changeover device as claimed in claim 1, wherein:
the transporting device has an advancing device for advancing the clamping frames to the working point; and
the floor-side clamping frame guide has a recess in the region of the advancing device, and the advancing device has one or more guide sections parts which can be inserted into the recess.

19. A processing station changeover device, the processing station changeover device comprising:
a frame magazine which can be rotated about an axis of rotation and is spaced apart from a working point; and
a transporting device with a floor-side guide for an upright transportation of the clamping frames, with a floor-side or lateral anti-tilt means and with a controllable towing mechanism arranged in the floor region, for the clamping frames wherein the frame magazine projects into the region of the floor-side clamping frame guide in an overlapping region, the floor-side clamping frame guide having a recess in the overlapping region, and the frame magazine having one or more guide parts which can be inserted into the recess.

20. A changeover device as claimed in claim 19, wherein:
the frame magazine has locks for the clamping frames at the loading points; and
the guide parts on the frame magazine are straight guide parts arranged and oriented as secants on a radius which is concentric with respect to the axis of rotation.

21. A changeover device as claimed in claim 19, wherein:
the frame magazine has locks for the clamping frames at the loading points; and
the guide parts on the frame magazine are straight guide parts.

22. A processing station for processing vehicle body workpieces, the processing station comprising:
a stationary framework at a vehicle body working point along a vehicle body transfer line;
a processing device adjacent to the working position; and
a changeover device for clamping frames, the changeover device comprising a frame magazine which can be rotated about an axis of rotation and is spaced apart from the working point, the frame magazine including a plurality of frame holders, each frame holder being at a loading point for receiving, holding and releasing one of the clamping frames, the frame magazine being rotated to selectively position said frame holders in a clamping frame releasing position and a transporting device with a floor-side clamping frame guide for receiving an individual clamping frame from one of the frame holders rotated into the clamping frame releasing position and for an upright transportation of the clamping frames along the floor-side clamping frame guide from the frame holders to adjacent the working position, with a floor-side or lateral anti-tilt means and with a controllable towing mechanism arranged in the floor region, for the clamping frames.

23. A processing station as claimed in claim 22, wherein the towing mechanism has a towing guide arranged next to or below the floor-side clamping frame guide, with at least one towing carriage driven in a controlled manner and with a coupling for engagement with a clamping frame.

24. A processing station as claimed in claim 22, wherein the frame magazine projects into the region of the floor-side clamping frame guide in an overlapping region, the floor-side clamping frame guide having a recess in the overlapping region, and the frame magazine having one or more guide parts which can be inserted into the recess.

25. A processing station as claimed in claim 22, wherein:
the transporting device has an advancing device for advancing the clamping frames to the working point; and
the floor-side clamping frame guide has a recess in the region of the advancing device, and the advancing device has one or more guide parts which can be inserted into the recess.

* * * * *